US012312153B2

(12) United States Patent
Chen et al.

(10) Patent No.: US 12,312,153 B2
(45) Date of Patent: May 27, 2025

(54) WARDROBE BOX AND HANGER SUPPORT MEMBER THEREFOR

(71) Applicant: Pratt Corrugated Holdings, Inc., Brookhaven, GA (US)

(72) Inventors: Shifeng Chen, Newport News, VA (US); Greg Sollie, Sharpsburg, GA (US); Hannah Conrad, Memphis, TN (US); Randy Ball, Peachtree City, GA (US)

(73) Assignee: Pratt Corrugated Holdings, Inc., Brookhaven, GA (US)

(*) Notice: Subject to any disclaimer, the term of this patent is extended or adjusted under 35 U.S.C. 154(b) by 0 days.

(21) Appl. No.: 18/540,343

(22) Filed: Dec. 14, 2023

(65) Prior Publication Data

US 2024/0109717 A1 Apr. 4, 2024

Related U.S. Application Data

(63) Continuation of application No. 17/548,772, filed on Dec. 13, 2021, now Pat. No. 11,878,857.
(Continued)

(51) Int. Cl.
*B65D 85/18* (2006.01)
*B31B 50/26* (2017.01)
(Continued)

(52) U.S. Cl.
CPC ............ *B65D 85/185* (2013.01); *B31B 50/26* (2017.08); *B65D 5/0254* (2013.01);
(Continued)

(58) Field of Classification Search
CPC .... B65D 58/157; B65D 58/18; B65D 58/182; B65D 5/10; B65D 5/4266; B65D 5/4608;
(Continued)

(56) References Cited

U.S. PATENT DOCUMENTS 1,448,629 A * 3/1923 Howard ................. A47G 25/36 223/71
1,680,932 A 8/1928 Bliss
(Continued)

FOREIGN PATENT DOCUMENTS

GB 2419130 4/2009
JP 2013056687 A * 3/2013
(Continued)

OTHER PUBLICATIONS

Chen, Shifeng; Certificate of Correction for U.S. Appl. No. 17/548,772, filed Dec. 13, 2021, mailed Feb. 27, 2024, 1 pg.
(Continued)

*Primary Examiner* — Steven A. Reynolds
*Assistant Examiner* — Prince Pal
(74) *Attorney, Agent, or Firm* — Taylor English Duma LLP

(57) ABSTRACT

A wardrobe box includes a sidewall enclosure comprising a plurality of side panels, the plurality of side panels comprising a first side panel and a second side panel opposite the first side panel, the sidewall enclosure at least partially defining an interior cavity of the wardrobe box; a first box mounting slot defined at a top edge of the first side panel and configured to engage a hanger support member; and a second box mounting slot defined at a top edge of second side panel and configured to engage the hanger support member.

16 Claims, 11 Drawing Sheets

Related U.S. Application Data

(60) Provisional application No. 63/127,602, filed on Dec. 18, 2020.

(51) Int. Cl.
*B31B 110/35* (2017.01)
*B65D 5/02* (2006.01)
*B65D 5/468* (2006.01)
*B65D 5/50* (2006.01)

(52) U.S. Cl.
CPC ......... *B65D 5/4608* (2013.01); *B65D 5/5059* (2013.01); *B31B 2110/35* (2017.08)

(58) Field of Classification Search
CPC .... B65D 5/106; B65D 2301/10; B65D 5/326; A47B 61/06
USPC ........ 211/124, 123; 206/279, 291, 290, 288, 206/289, 294, 229, 216; 223/71
See application file for complete search history.

(56) References Cited

U.S. PATENT DOCUMENTS

| | | | | | |
|---|---|---|---|---|---|
| 1,843,547 | A | * | 2/1932 | Dukes | B65D 85/18 206/290 |
| 2,028,247 | A | | 1/1936 | Ritter, Jr. | |
| 2,561,053 | A | * | 7/1951 | Fallert | A47G 25/54 206/291 |
| 2,760,627 | A | * | 8/1956 | Denby | B65D 85/18 206/289 |
| 2,770,357 | A | * | 11/1956 | Sheard | B65D 85/185 229/122 |
| 2,796,977 | A | * | 6/1957 | Divine | B65D 85/185 206/291 |
| 2,807,354 | A | * | 9/1957 | Belsinger | B65D 85/185 229/122 |
| 2,817,431 | A | * | 12/1957 | Cecil | B65D 85/185 229/125.21 |
| 2,827,160 | A | * | 3/1958 | Richer | A47G 25/54 206/291 |
| 2,873,851 | A | * | 2/1959 | Abramson | B65D 85/185 206/291 |
| 2,883,042 | A | * | 4/1959 | Richer | B65D 5/18 229/113 |
| 2,893,545 | A | | 7/1959 | Garfunkel | |
| 2,904,190 | A | | 9/1959 | Gidwitz et al. | |
| 2,907,452 | A | | 10/1959 | Linder et al. | |
| 2,925,175 | A | * | 2/1960 | Williamson | B65D 85/18 221/45 |
| 2,974,779 | A | * | 3/1961 | Belsinger | B65D 85/185 229/122 |
| 2,980,239 | A | * | 4/1961 | Belsinger | B65D 85/185 229/125.39 |
| 2,993,602 | A | * | 7/1961 | Zeman | B65D 85/185 206/291 |
| 3,003,616 | A | | 10/1961 | Field et al. | |
| 3,026,996 | A | * | 3/1962 | Belsinger | B65D 85/185 312/259 |
| 3,035,688 | A | | 5/1962 | Field et al. | |
| 3,037,617 | A | * | 6/1962 | Collin | B65D 85/185 206/279 |
| 3,057,461 | A | * | 10/1962 | Richer | B65D 85/185 211/124 |
| 3,057,482 | A | * | 10/1962 | Richer | B65D 85/185 211/124 |
| 3,112,027 | A | | 11/1963 | Field et al. | |
| 3,139,978 | A | * | 7/1964 | Moglia | B65D 85/185 206/291 |
| 3,270,865 | A | | 9/1966 | Brennan | |
| 3,294,221 | A | * | 12/1966 | Notko | B65D 85/185 229/122 |
| 3,349,923 | A | | 10/1967 | Feder | |
| 3,357,542 | A | * | 12/1967 | Aquino | B65D 85/185 229/230 |
| 3,360,113 | A | * | 12/1967 | Bower | B65D 85/185 206/290 |
| 3,369,652 | A | | 2/1968 | Bebout | |
| 3,472,360 | A | * | 10/1969 | Bacharach | B65D 85/185 206/279 |
| 3,493,101 | A | | 2/1970 | Collin | |
| 3,519,139 | A | * | 7/1970 | Brennan | B65D 85/185 211/124 |
| 3,565,242 | A | * | 2/1971 | Konkoli | B65D 85/185 229/122 |
| 3,610,427 | A | | 10/1971 | Maziarka et al. | |
| 3,633,760 | A | * | 1/1972 | Vosbikian | B65D 85/185 211/124 |
| 3,800,960 | A | | 4/1974 | Collin | |
| 3,866,750 | A | * | 2/1975 | Collin | B65D 85/185 229/122 |
| 3,902,597 | A | | 9/1975 | Brennan | |
| 4,034,866 | A | | 7/1977 | Beckwith | |
| D249,123 | S | | 8/1978 | Dogliotti | |
| 4,111,300 | A | * | 9/1978 | Partain | B65D 85/185 206/290 |
| 4,119,197 | A | * | 10/1978 | Pilz | B65D 85/18 206/289 |
| 4,151,947 | A | * | 5/1979 | Partain | B65D 85/185 229/122 |
| 4,272,116 | A | | 6/1981 | Tufte, Jr. | |
| 4,293,069 | A | * | 10/1981 | Partain | B65D 85/185 206/289 |
| 4,293,076 | A | | 10/1981 | Collin | |
| 4,496,060 | A | | 1/1985 | Anderson et al. | |
| 4,512,477 | A | * | 4/1985 | Densen | A47B 43/02 229/122 |
| 4,576,280 | A | * | 3/1986 | Dove | F16B 7/0486 206/285 |
| D290,444 | S | | 6/1987 | Osborne | |
| 4,773,538 | A | * | 9/1988 | Crawford | B65D 85/18 229/122 |
| 4,811,853 | A | | 5/1989 | Mead et al. | |
| 4,944,395 | A | * | 7/1990 | Coursen | B65D 5/2033 206/289 |
| 5,011,021 | A | * | 4/1991 | Coltrane | B65D 5/705 493/63 |
| 5,014,847 | A | | 5/1991 | Droguet | |
| 5,161,692 | A | | 11/1992 | Knierim | |
| D343,122 | S | | 1/1994 | Harper | |
| D537,244 | S | | 2/2007 | Danechi | |
| 7,710,902 | B2 | | 5/2010 | Vasseur | |
| 8,127,947 | B2 | | 3/2012 | Chacon | |
| D681,442 | S | | 5/2013 | Kengla | |
| D681,444 | S | | 5/2013 | Oja et al. | |
| 8,915,420 | B2 | * | 12/2014 | Masague | B65D 5/10 229/126 |
| D751,891 | S | | 3/2016 | Solovov, Jr. et al. | |
| 9,706,838 | B2 | * | 7/2017 | Shaw | B65D 85/18 |
| D799,252 | S | | 10/2017 | Coretti, Jr. et al. | |
| D801,803 | S | | 11/2017 | Mitten et al. | |
| 9,856,073 | B2 | * | 1/2018 | Perron | B65D 85/185 |
| 9,988,193 | B1 | | 6/2018 | Koeppel et al. | |
| D821,866 | S | | 7/2018 | Scotti | |
| D871,203 | S | | 12/2019 | Koeppel et al. | |
| D910,431 | S | | 2/2021 | Gray | |
| 10,913,568 | B2 | * | 2/2021 | Sollie | B65D 5/12 |
| D934,068 | S | | 10/2021 | Hochschuler | |
| D956,494 | S | | 7/2022 | Chen et al. | |
| 11,427,375 | B2 | | 8/2022 | Hariharan et al. | |
| D964,163 | S | * | 9/2022 | Chen | D9/432 |
| 11,447,286 | B2 | * | 9/2022 | Sollie | B65D 5/46112 |
| D970,339 | S | | 11/2022 | Tao et al. | |
| D977,968 | S | * | 2/2023 | Sollie | D9/433 |
| D990,310 | S | * | 6/2023 | Chen | D9/432 |
| D997,739 | S | | 9/2023 | Chen et al. | |
| D997,740 | S | | 9/2023 | Chen et al. | |
| D997,741 | S | | 9/2023 | Chen et al. | |
| D1,007,300 | S | | 12/2023 | Chen et al. | |
| D1,009,630 | S | | 1/2024 | Gatto et al. | |
| 11,878,857 | B2 | | 1/2024 | Chen et al. | |

(56) References Cited

U.S. PATENT DOCUMENTS

| | | | | |
|---|---|---|---|---|
| D1,026,667 | S | 5/2024 | Chen et al. | |
| D1,040,652 | S | 9/2024 | Zhu | |
| D1,059,170 | S | 1/2025 | Chen et al. | |
| 12,258,202 | B2 | 3/2025 | Chen et al. | |
| 2002/0148797 | A1 | 10/2002 | Feder | |
| 2008/0110712 | A1* | 5/2008 | Strong | A47B 61/06<br>190/13 R |
| 2010/0308067 | A1* | 12/2010 | Lopez Masague | B65D 5/6605<br>220/810 |
| 2014/0202896 | A1 | 7/2014 | Perron et al. | |
| 2016/0096651 | A1* | 4/2016 | Klein | B31B 50/62<br>229/117.14 |
| 2018/0255892 | A1* | 9/2018 | Cardenas | D06F 59/02 |
| 2019/0159591 | A1* | 5/2019 | Krystalovich | A47B 43/02 |
| 2021/0024247 | A1* | 1/2021 | Sollie | B65D 5/4266 |
| 2021/0371154 | A1* | 12/2021 | Steele | B65D 5/10 |
| 2021/0394951 | A1* | 12/2021 | Chen | B65D 5/0227 |
| 2022/0135276 | A1* | 5/2022 | Lee, Sr. | B65D 5/14<br>229/117.17 |
| 2022/0194689 | A1* | 6/2022 | Chen | B65D 5/4608 |
| 2024/0116696 | A1 | 4/2024 | Chen et al. | |

FOREIGN PATENT DOCUMENTS

| | | |
|---|---|---|
| JP | D2021-8859 | 12/2021 |
| KR | 101564728 | 10/2015 |

OTHER PUBLICATIONS

Chen, Shifeng; Notice of Allowance for U.S. Appl. No. 17/548,772, filed Dec. 13, 2021, mailed Oct. 3, 2023, 18 pgs.
Chen, Shifeng; Requirement for Restriction/Election for U.S. Appl. No. 17/548,772, filed Dec. 13, 2021, mailed Mar. 17, 2023, 6 pgs.
Chen; Shifeng; Non-Final Office Action for U.S. Appl. No. 17/548,772, filed Dec. 13, 2021, mailed Apr. 24, 2023, 29 pgs.
Bankers Box Smooth Move Wardrobe Moving Boxes, Short, 20 x 20 x 34 Inches, 3 Pack (7710902). Online, published date Apr. 4, 2016. Retrieved on Feb. 10, 2022 from URL: https://www.amazon.com/Bankers-Box-Smooth Move-Wardrobe-7710902/dp/BO 1 DVPI DOA/ref=sr 1_5?crid=3APWGH IA7TPLR&keywords=wardrobe%2Bbox&qid=1644530720&sprefix=, 1 pg.
Chen, Shifeng; Non-Final Office Action for U.S. Appl. No. 29/765,524, filed Jan. 8, 2021, mailed Feb. 16, 2022, 13 pgs.
Chen, Shifeng; Notice of Allowance for U.S. Appl. No. 29/765,524, filed Jan. 8, 2021, mailed Jun. 2, 2022, 8 pgs.
Bankers Box Smooth Move Wardrobe Moving Boxes, Tall, 24 x 24 x 40 Inches, 3 Pack (7711001 ). Online, published date Apr. 25, 2012. Retrieved on Oct. 5, 2022 from URL: https://www.amazon.com/Bankers-Box-SmoothMove-Wardrobe-7711001/dp/B007XPBW4l?th=1, 2 pgs.
Chen, Shifeng; Non-Final Office Action for U.S. Appl. No. 29/848,657, filed Aug. 4, 2022, mailed Oct. 13, 2022, 9 pgs.
Chen, Shifeng; Notice of Allowance for U.S. Appl. No. 29/848,657, filed Aug. 4, 2022, mailed Feb. 13, 2023, 13 pgs.
Uboxes Wardrobe Boxes—Qty: 6 Boxes w Bars—Moving Boxes Fast. Online, published date Sep. 12, 2017. Retrieved on Oct. 5, 2022 from URL: https://www.amazon.in/U BOXES-Wardrobe-Boxes-Bars-Moving/dp/B005JZI UZS, 2 pgs.
Eobalak.Cz; Article entitled: "Wardrobe Box", located at <https:// www. eobalak.cz/en/boxes/49-wardrobe-boxes.html, accessed on Aug. 25, 2020, 3 pgs.
RHE; Article entitled: "Hanger Pack & Wardrobe Container Boxes", located at <https://rhecontainer.com>, accessed on Aug. 25, 2020, 4 pgs.
Chen, Shifeng; Non-Final Office Action for U.S. Appl. No. 18/540,356, filed Dec. 14, 2023, mailed Aug. 28, 2024, 26 pgs.
Chen, Shifeng; Notice of Allowance for U.S. Appl. No. 29/848,658, filed Aug. 4, 2022, mailed Sep. 13, 2024, 38 pgs.
Profiware Frei Haus 2.60 BC; 3 XXL Kleiderkarton Kleiderbox Kartonschrank Kartons. Online, published date unknown. Retrieved on Sep. 9, 2024 from URL: https://www.ebay.de/itm/230810087941, 1 pg.
Chen, Shifeng; Notice of Allowance for U.S. Appl. No. 18/540,356, filed Dec. 14, 2023, mailed Nov. 29, 2024, 13 pgs.
Chen, Shifeng; Corrected Notice of Allowance for U.S. Appl. No. 18/540,356, filed Dec. 14, 2023, mailed Feb. 27, 2025, 9 pgs.

* cited by examiner

WARDROBE BOX AND HANGER SUPPORT MEMBER THEREFOR

CROSS-REFERENCE TO RELATED APPLICATIONS

The present application is a continuation of U.S. application Ser. No. 17/548,772, filed Dec. 13, 2021, which claims the benefit of U.S. Application No. 63/127,602, filed Dec. 18, 2020, each of which is hereby specifically incorporated by reference herein in its entirety.

TECHNICAL FIELD

This disclosure relates to boxes. More specifically, this disclosure relates to a wardrobe box assembly.

BACKGROUND

Wardrobe boxes typically comprise a hang-bar for hanging clothing within a box. However, hang bars often lack suitable stability when mounted to the box, which can result in the clothing and/or the hang bar falling down within the wardrobe box.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a wardrobe box assembly comprising a wardrobe box defining an interior cavity, a first box mounting slot, and a second box mounting slot; and a hanger support member mounted on the wardrobe box and extending laterally across the interior cavity, the hanger support member defining a first hanger engagement slot engaging the first box mounting slot and a second hanger engagement slot engaging the second box mounting slot.

Also disclosed is a method of assembling a wardrobe box assembly, the method comprising providing a wardrobe box and a hanger support member, the wardrobe box defining an interior cavity, a first box mounting slot, and a second box mounting slot, the hanger support member defining a first hanger engagement slot and a second hanger engagement slot; aligning the first hanger engagement slot with the first box mounting slot and aligning the second hanger engagement slot with the second box mounting slot; and engaging the first hanger engagement slot with the first box mounting slot and engaging the second hanger engagement slot with the second box mounting slot to mount the hanger support member on the wardrobe box in a use configuration, wherein the hanger support member extends laterally across the interior cavity.

Additionally, disclosed is a wardrobe box comprising a sidewall enclosure comprising a plurality of side panels, the plurality of side panels comprising a first side panel and a second side panel opposite the first side panel, the sidewall enclosure at least partially defining an interior cavity of the wardrobe box; a first box mounting slot defined at a top edge of the first side panel and configured to engage a hanger support member; and a second box mounting slot defined at a top edge of second side panel and configured to engage the hanger support member.

Further disclosed is a hanger support member comprising a first hanger panel; a second hanger panel hingedly connected to the first hanger panel at a first hanger bend line, the second hanger panel folded at the first hanger bend line to lie substantially flat against the first hanger panel; a first hanger engagement slot extending into each of the first hanger panel and the second hanger panel at a bottom hanger end of the hanger support member, proximate to a first side of the hanger support member; and a second hanger engagement slot extending into each of the first hanger panel and the second hanger panel at the bottom hanger end, proximate to a second side of the hanger support member opposite the first side.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
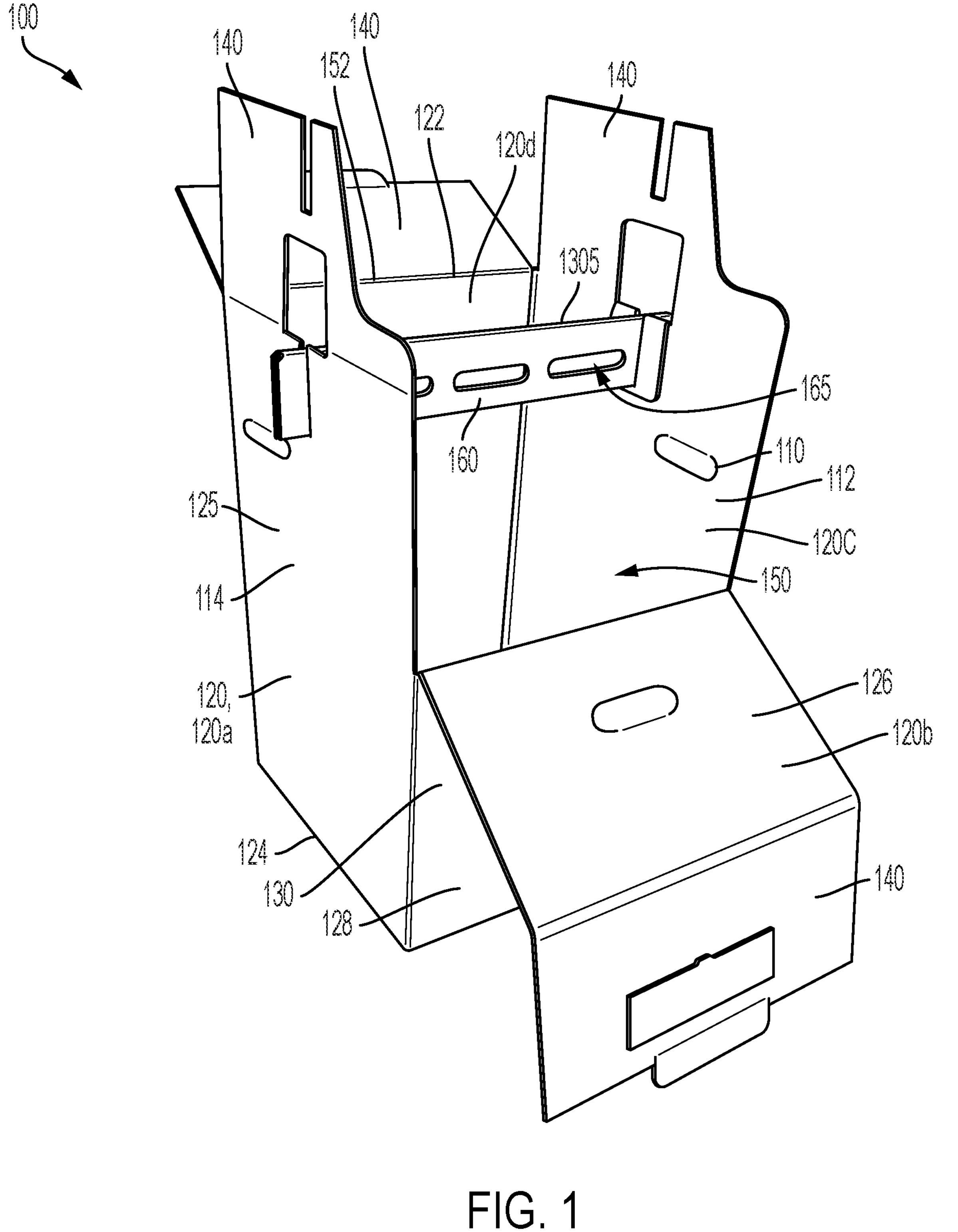
FIG. 1 is a front perspective view of a wardrobe box assembly in an open configuration, the wardrobe box assembly comprising a wardrobe box and a hanger support member mounted on the wardrobe box in a use configuration, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms “a,” “an” and “the” include plural referents unless the context clearly dictates otherwise. Thus, for example, reference to “an element” can include two or more such elements unless the context indicates otherwise.

Ranges can be expressed herein as from “about” one particular value, and/or to “about” another particular value. When such a range is expressed, another aspect includes from the one particular value and/or to the other particular value. Similarly, when values are expressed as approximations, by use of the antecedent “about,” it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms “optional” or “optionally” mean that the subsequently described event or circumstance can or cannot occur, and that the description includes instances where said event or circumstance occurs and instances where it does not.

The word “or” as used herein means any one member of a particular list and also includes any combination of members of that list. Further, one should note that conditional language, such as, among others, “can,” “could,” “might,” or “may,” unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a wardrobe box assembly and associated methods, systems, devices, and various apparatus. Example aspects of the wardrobe box assembly can comprise a wardrobe box and a hanger support member mounted on the wardrobe box. It would be understood by one of skill in the art that the wardrobe box assembly is described in but a few exemplary embodiments among many. No particular terminology or description should be considered limiting on the disclosure or the scope of any claims issuing therefrom.

FIG. 1 is a front perspective view of a wardrobe box assembly 100, in accordance with one aspect of the present disclosure. Example aspects of the wardrobe box assembly 100 can comprise a wardrobe box 110 and a hanger support member 160 mounted on the wardrobe box 110 in a use configuration. The wardrobe box 110 can define an inner box surface 112 and an outer box surface 114. As shown, the wardrobe box 110 can define a plurality of side panels 120 that together can define a sidewall enclosure 125 in an expanded configuration, as shown. For example, the side panels 120 can comprise a left side panel 120*a*, a front side panel 120*b*, a right side panel 120*c* opposite the left side panel 120, and a rear side panel 120*d* opposite the front side panel 120*b*. Each of the side panels 120 can define a top edge 122 and a bottom edge 124. The wardrobe box 110 can further define a plurality of bottom panels 230 (shown in FIG. 2) and a plurality of top panels 140. Each of the top panels 140 can extend from a corresponding one of the side panels 120 at the top edge 122 thereof, and each of the bottom panels 230 can extend from a corresponding one of the side panels 120 at the bottom edge 124 thereof. According to example aspect, the side panels 120 and bottom panels 230 can generally define an interior cavity 150 of wardrobe box 110. An upper opening 152 can be defined at the top edge 122 of the side panels 120 to allow access to the interior cavity 150. In the present aspect, the wardrobe box assembly

Figure 15:
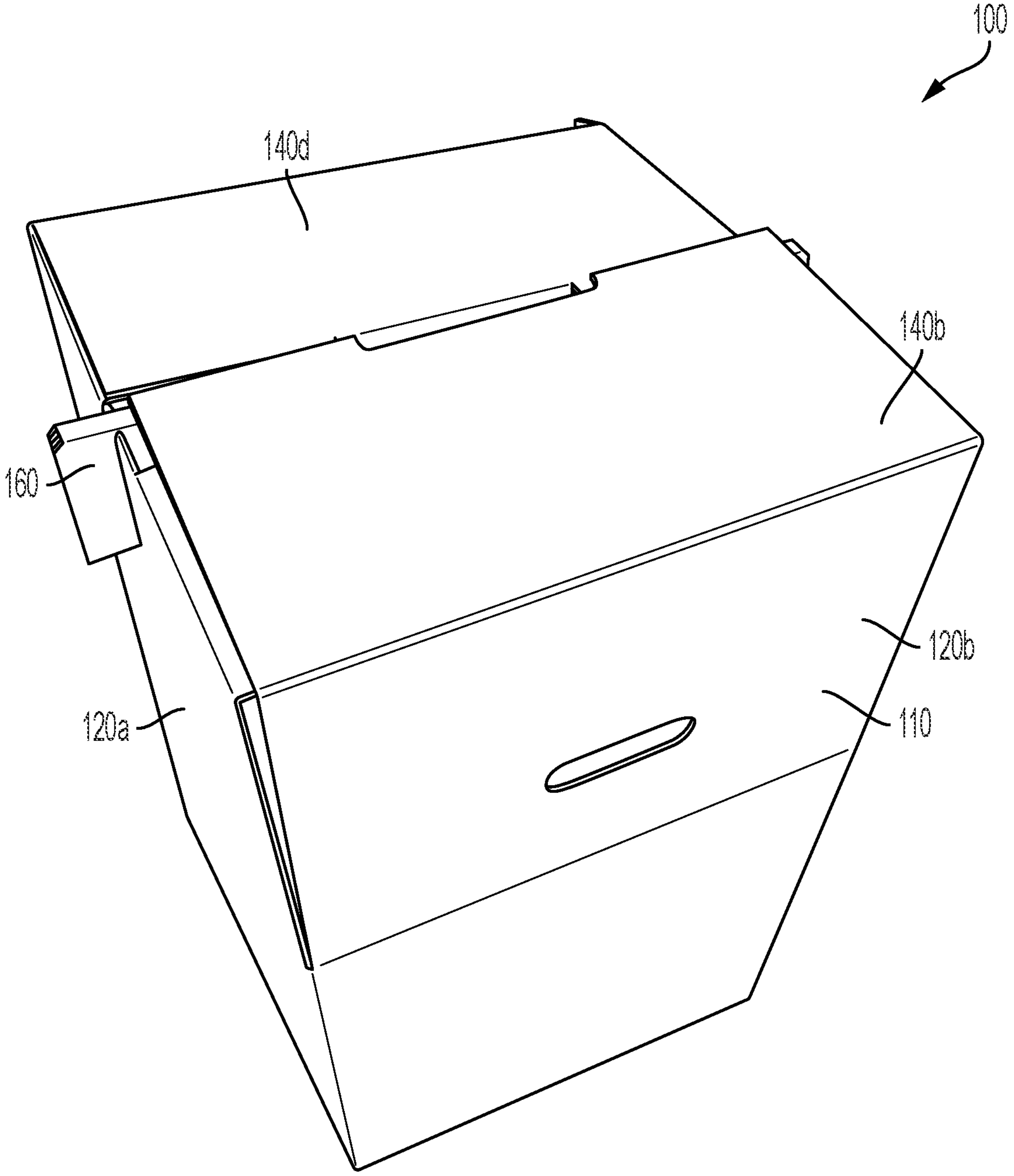
FIG. 15 illustrates the wardrobe box assembly in the closed configuration.

100 can be oriented in an open configuration, as shown, wherein the upper opening 152 is uncovered to allow access to the interior cavity 150, and a closed configuration, as shown in FIG. 15, wherein the upper opening 152 is covered by the top panels 140, thus prohibiting access to the interior cavity 150. In some aspects, an upper panel portion 126 of the front side panel 120*b* can be configured to fold away from the interior cavity 150, relative to a lower panel portion 128 of the front side panel 120*b*, to provide improved access to the interior cavity 150 at a front side 130 of the wardrobe box 110 in the open configuration, as described in further detail below. In example aspects, the wardrobe box 110 can comprise paperboard (e.g., cardboard). Specifically, the wardrobe box 110 can be formed from corrugated cardboard in some aspects. Other example aspects of the wardrobe box 110 can comprise any other suitable material or combination of materials, including, but not limited to, plastic, paper, fiberboard, containerboard, or the like.

The hanger support member 160 can be configured to support hanging clothes within the interior cavity 150 of the wardrobe box 110. According to example aspects, the hanger support member 160 can be mounted to the sidewall enclosure 125 of the wardrobe box 110. In the present aspect, the hanger support member 160 can be mounted to the opposing left and right side panels 120*a,c* substantially at or near the top edges 122 thereof. As such, the hanger support member 160 can extend laterally across the interior cavity 150 substantially at or near the upper opening 152, as shown. Furthermore, the hanger support member 160 can be oriented substantially within the interior cavity 150, as shown, or can be oriented partially within the interior cavity 150 or above the interior cavity 150, relative to the orientation shown. In example aspects, the hanger support member 160 can be oriented about centrally between the front side panel 120*b* and the opposing rear side panel 120*d*, which can substantially center the hanging clothes supported on the hanger support member 160 between the front and rear side panels 120*b,d*.

In some example aspects, the hanger support member 160 can define one or more hanger openings 165 formed therethrough. For example, in the present aspect, three of the hanger openings 165 are spaced laterally across the hanger support member 160. Other aspects of the hanger support member 160 can comprise more or fewer hanger openings 165. To utilize the wardrobe box 110, a hanger supporting a hanging item of clothing can engage one of the hanger openings 165 formed through the hanger support member 160. The hanger and the corresponding clothing can be suspended within the interior cavity 150 by the hanger support member 160. Other aspects of the hanger support member 160 may not define the hanger openings 165. For example, in aspects not comprising the hanger openings 165, a hanger can engage a top side 1305 of the hanger support member 160 to suspend the hanger therefrom. In example aspects, the hanger support member 160 can comprise paperboard (e.g., cardboard). Specifically, the hanger support member 160 can be formed from corrugated cardboard in some aspects. Other example aspects of the hanger support member 160 can comprise any other suitable material or combination of materials, including, but not limited to, plastic, paper, fiberboard, containerboard, or the like.

Figure 2:
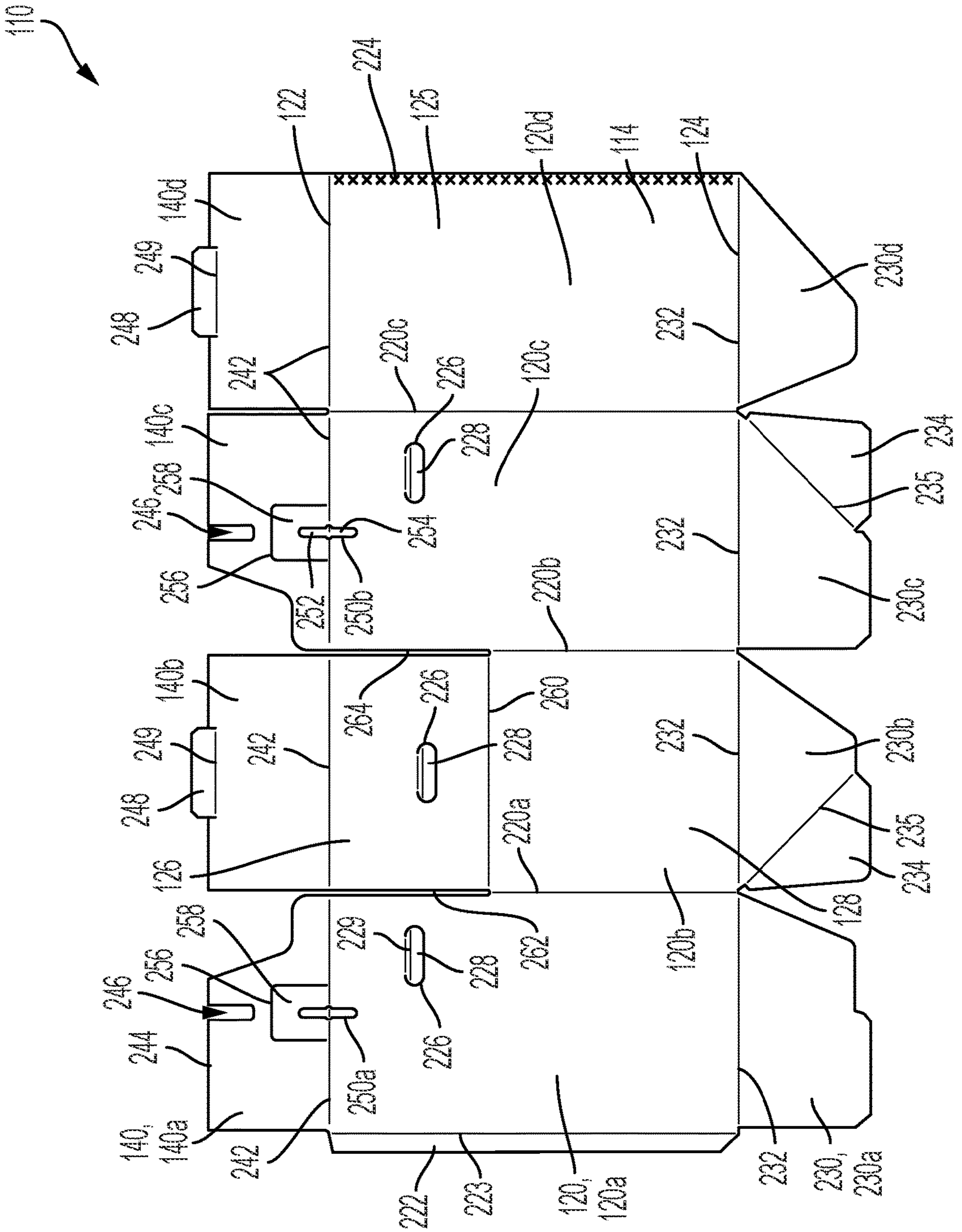
FIG. 2 is a top elevation view of the wardrobe box in blank form, according to an aspect of the present disclosure.
Figure 8:
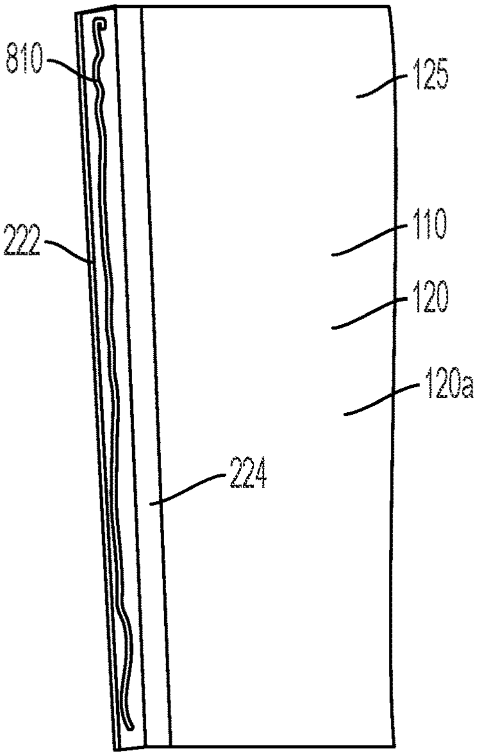
FIG. 8 illustrates a first step in configuring the wardrobe box of FIG. 1 in an expanded configuration.

FIG. 2 illustrates the wardrobe box 110 of the wardrobe box assembly 100 (shown in FIG. 1) in blank form, according to an example aspect of the present disclosure, wherein the outer box surface 114 is visible. The wardrobe box 110 can define any suitable dimensions. As shown, the wardrobe box 110 can comprise the side panels 120, the bottom panels 230, and the top panels 140. In the present aspect, the wardrobe box 110 can comprise four of the side panels 120, four of the bottom panels 230, and four of the top panels 140. In other aspects, however, the wardrobe box 110 can comprise more or fewer side panels 120, bottom panels 230, and/or top panels 140. The side panels 120 of the wardrobe box 110 can comprise the left, front, right, and rear side panels 120*a,b,c,d*. The front side panel 120*b* can be hingedly coupled to the left side panel 120*a* at a first side bend line 220*a*, the right side panel 120*c* can be hingedly coupled to the front side panel 120*b* opposite the left side panel 120*a* at a second side bend line 220*b*, and the rear side panel 120*d* can be hingedly coupled to the right side panel 120*c* opposite the front side panel 120*b* at a third side bend line 220*c*. An attachment flap 222 can be hingedly coupled to the left side panel 120*a* opposite the front side panel 120*b* at an attachment flap bend line 223. The side panels 120 can be folded at the corresponding first, second, and third side bend lines 220*a,b,c* to define the sidewall enclosure 125. Additionally, the attachment flap 222 can be folded at the attachment flap bend line 223 and can be secured to an attachment region 224 of the rear side panel 120*d* to retain the side panels 120 in the expanded configuration (shown in FIG. 1). In other aspects, the attachment flap 222 can extend from the rear side panel 120*d* and the attachment region 224 can be located on the left side panel 120*a*, as illustrated in FIG. 8. According to example aspects, as shown, one or more of the side panels 120 can define a handle cut 226 formed therethrough, and each handle cut 226 can define a corresponding handle flap 228 hingedly coupled to the side panel by a handle bend line 229. Each of the handle flaps 228 can be folded at the corresponding handle bend line 229 to uncover a corresponding handle opening defined by the handle cut 226. A user can insert a hand through each of the handle openings and grip the wardrobe box 110 to facilitate carrying the wardrobe box assembly 100 (shown in FIG. 1). The various bend lines described herein can be formed by creasing, perforations, or any other suitable technique or varying techniques known in the art for forming bend lines.

In the present aspect, the bottom panels 230 can comprise left, front, right, and rear bottom panels 230*a,b,c,d*. The left, front, right, and rear bottom panels 230*a,b,c,d* can extend from the bottom edge 124 of the corresponding left, front, right, and rear side panels 120*a,b,c,d*, respectively, and can be hingedly connected thereto by corresponding bottom bend lines 232. In example aspects, a coupling area 234 can extend from and be hingedly coupled to each of the front and right bottom panels 230*b,c*, respectively, at a coupling bend line 235, as shown. The coupling area connected to the front bottom panel 230*b* can be arranged at a left side of the front bottom panel 230*b*, relative to the orientation shown, and the coupling area connected to the right bottom panel 230*c* can be arranged at a right side of the right bottom panel 230*c*, relative to the orientation shown. In other aspects, any two of the bottom panels 230 can comprise one of the coupling areas 234 extending therefrom, which can be coupled to an adjacent one of the bottom panels 230 not comprising one of the coupling areas 234. According to example aspects, the coupling area 234 extending from the front bottom panel 230*b* can be coupled to the adjacent left bottom panel 230*a*, and the coupling area 234 extending from the right bottom panel 230*c* can be coupled to the adjacent rear bottom panel 230*d* when assembling the wardrobe box 110 from the blank form shown to the expanded configuration, as shown in FIG. 1. In some aspects, an adhesive, such as glue, can be applied to each of the coupling areas 234, and the coupling areas 234 can be adhered to the corresponding left and rear bottom panels 230*a,d*. In other aspects, the coupling areas 234 can be coupled to the corresponding left and rear bottom panels 230*a,d* by any other suitable fastener or fastening technique known in the art.

In example aspects, the top panels 140 can comprise left, front, right, and rear top panels 140*a,b,c,d*. The left, front, right, and rear top panels 140*a,b,c,d* can extend from the top edge 122 of the corresponding left, front, right, and rear side panels 120*a,b,c,d* and can be hingedly connected thereto by corresponding top bend lines 242. Each of the top panels 140 can define a distal edge 244 distal to the corresponding side panel 120. In the present aspect, each of the left and right top panels 140*a,c* can define a closure slot 246 formed at the corresponding distal edge 244 thereof, and each of the front and rear top panels 140*b,d* can define a closure tab 248 extending generally from the corresponding distal edge 244 thereof. Each of the closure tabs 248 can be hingedly coupled to the corresponding front or rear top panel 140*b,d* by a closure bend line 249, as shown. The closure tabs 248 can be configured to removably engage the closure slots 246 to retain the wardrobe box assembly 100 in the closed configuration, as described in further detail below with respect to FIG. 14.

According to example aspects, the wardrobe box 110 can further define a pair of longitudinal box slots 250. A first longitudinal box slot 250*a* of the longitudinal box slots 250 can extend from the left top panel 140*a* to the left side panel 120*a*, across and substantially perpendicular to the corresponding top bend line 242. A second longitudinal box slot 250*b* of the longitudinal box slots 250 can extend from the right top panel 140*c* to the right side panel 120*c*, across and substantially perpendicular to the corresponding top bend line 242. As such, each of the longitudinal box slots 250 can define an upper slot portion 252 formed through the corresponding top panel 140 and a lower slot portion 254 formed through the corresponding side panel 120. In other aspects, the first longitudinal box slot 250*a* can extend from the front top panel 140*b* to the front side panel 120*b* and the second longitudinal box slot 250*b* can extend from the rear top panel 140*d* to the rear side panel 120*d*. In example aspects, as shown, each of the left and right top panels 140*a,c* can define a tab cut 256 extending from the corresponding top bend line 242 and around the upper slot portion 252 of the corresponding longitudinal box slot 250. Each of the tab cuts 256 can be substantially U-shaped in the present aspect, and can define a corresponding mounting tab 258 hingedly coupled to the corresponding side panel 120 at the corresponding top bend line 242. Thus, the upper slot portion 252 of each longitudinal box slot 250 can be formed through the corresponding mounting tab 258, as shown.

In some aspects, the front side panel 120*b* and/or any other ones of the side panels 120 can define the upper panel portion 126 hingedly connected to the lower panel portion 128 at a folding bend line 260. The upper panel portion 126 can extend from the corresponding top bend line 242 to the folding bend line 260, and the lower panel portion 128 can extend from the corresponding bottom bend line 232 to the folding bend line 260. Furthermore, a first panel slit 262 can be defined between the upper panel portion 126 and the left side panel 120*a*, and a second panel slit 264 can be defined between the upper panel portion 126 and the right side panel 120*c*, such that the upper panel portion 126 can be unattached to each of the left and right side panels 120*a,c*. In the present aspect, the handle flap 228 of the front side panel 120*b* can be connected to the upper panel portion 126, as shown. In other aspects, the upper panel portion 126 can be connected to either or both of the left side panel 120*a* and the right side panel 120, and/or the folding bend line 260 may not be defined between the upper panel portion 126 and the lower panel portion 128.

Figure 3:
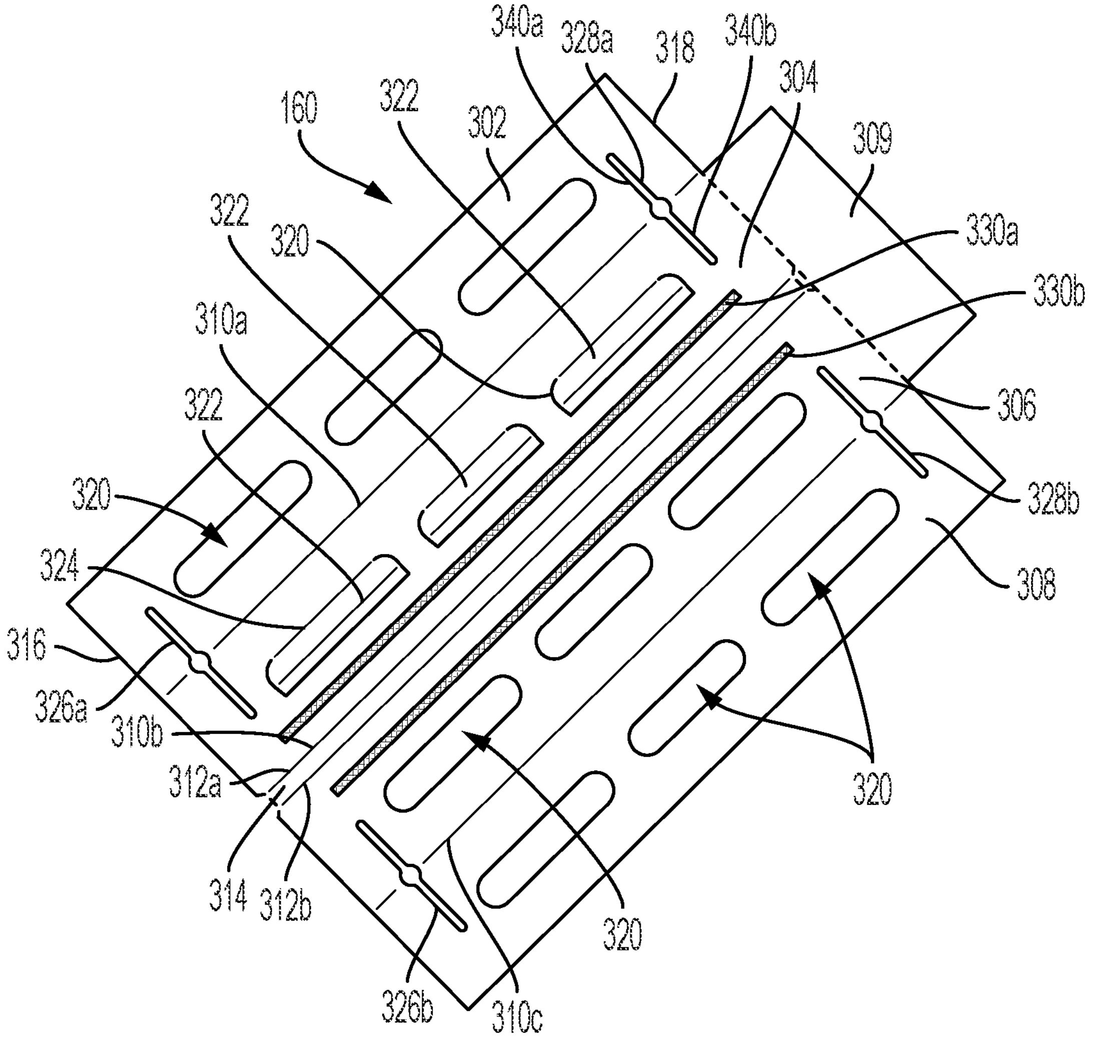
FIG. 3 is a top elevation view of the hanger support member in blank form, according to an aspect of the present disclosure.

FIG. 3 illustrates the hanger support member 160 of the wardrobe box assembly 100 (shown in FIG. 1) in blank form, according to an example aspect of the present disclosure. The hanger support member 160 can define any suitable dimensions. As shown, the hanger support member 160 can define a first inner panel 304, a second inner panel 306, a first outer panel 302, and a second outer panel 308. The first outer panel 302 can be hingedly connected to the first inner panel 304 by a first hanger bend line 310*a*, the second inner panel 306 can be hingedly connected to the first inner panel 304 opposite the first outer panel 302 at a second hanger bend line 310*b*, and the second outer panel 308 can be hingedly connected to the second inner panel 306 opposite the first inner panel 304 at a third hanger bend line 310*c*. In the present aspect, the second hanger bend line 310*b* connecting the first inner panel 304 to the second inner panel 306 can define first and second parallel bend lines 312*a,b* and an elongated spine 314 therebetween. However, other aspects of the second hanger bend line 310*b* can simply comprise a singular bend line, like the first and third hanger bend lines 310*a,c*. In some aspects, some or all of the first, second, and third hanger bend lines 310*a,b,c* can comprise perforations configured to facilitate folding along the corresponding hanger bend lines 310*a,b,c*. The hanger support member 160 can be folded at the first, second, and third hanger bend lines 310*a,b,c* when folding the hanger support member 160 from the blank form shown to a folded orientation, as described in further detail with respect to FIGS. 6 and 7.

According to example aspects, the hanger support member 160 can define a left end 316 and a right end 318. Each of the first and second inner panels 304,306 and first and second outer panels 302,308 can extend from the left end 316 to the right end 318. In some aspects, an attachment panel 309 can be detachably coupled to the hanger support member 160 and can be secured to the wardrobe box 110, as described in further detail with respect to FIG. 4. In the present aspect, the attachment panel 309 can extend from the hanger support member 260 at the right end 318 thereof. Specifically, in the present aspect, the attachment panel 309 can extend alongside the first and second inner panels 304,306 substantially from the first hanger bend line 310*a* to the third hanger bend line 310*b*. In other aspects, the attachment panel 309 may extend elsewhere from the hanger support member 160. Other aspects of the hanger support member 160 may not comprise the attachment panel 309.

As shown, a plurality of lateral hanger apertures 320 can be formed through each of the first outer panel 302, the first inner panel 304, the second inner panel 306, and the second outer panel 308. In example aspects, a lateral hanger flap 322 can selectively cover each of the lateral hanger apertures 320 defined in the first inner panel 304. The lateral hanger flaps 322 can be hingedly connected to the first inner panel 304 at a hanger flap bend line 324. Other aspects, such as the aspect shown in FIG. 16, do not comprise the lateral hanger flaps 322. Furthermore, a first pair of longitudinal hanger slots 326*a,b* can be formed through the hanger support member 160 adjacent to the left end 316, and a second pair of longitudinal hanger slots 328*a,b* can be formed through the hanger support member 160 adjacent to the right end 318. The longitudinal hanger slot 326*a* and the longitudinal hanger slot 328*a* can extend from the first outer panel 302 to the first inner panel 304, across and substantially perpendicular to the first hanger bend line 310*a*. Thus, each of the longitudinal hanger slots 326*a*,328*a* can define a first segment 340*a* formed through the first outer panel 302 and a second segment 340*b* formed through the first inner panel 304. The longitudinal hanger slot 326*b* and the longitudinal hanger slot 328*b* can extend from the second inner panel 306 to the second outer panel 308, across and substantially perpendicular to the third hanger bend line 310*c*. Thus, each of the longitudinal hanger slots 326*b*,328*b* can define the first segment 340*a* formed through the second outer panel 308 and the second segment 340*b* formed through the second inner panel 306. The longitudinal hanger slot 326*a* can be longitudinally aligned with the longitudinal hanger slot 326*b* and laterally aligned with the longitudinal hanger slot 328*a*. The longitudinal hanger slot 328*b* can be longitudinally aligned with the longitudinal hanger slot 328*a* and laterally aligned with the longitudinal hanger slot 326*b*.

Figure 4:
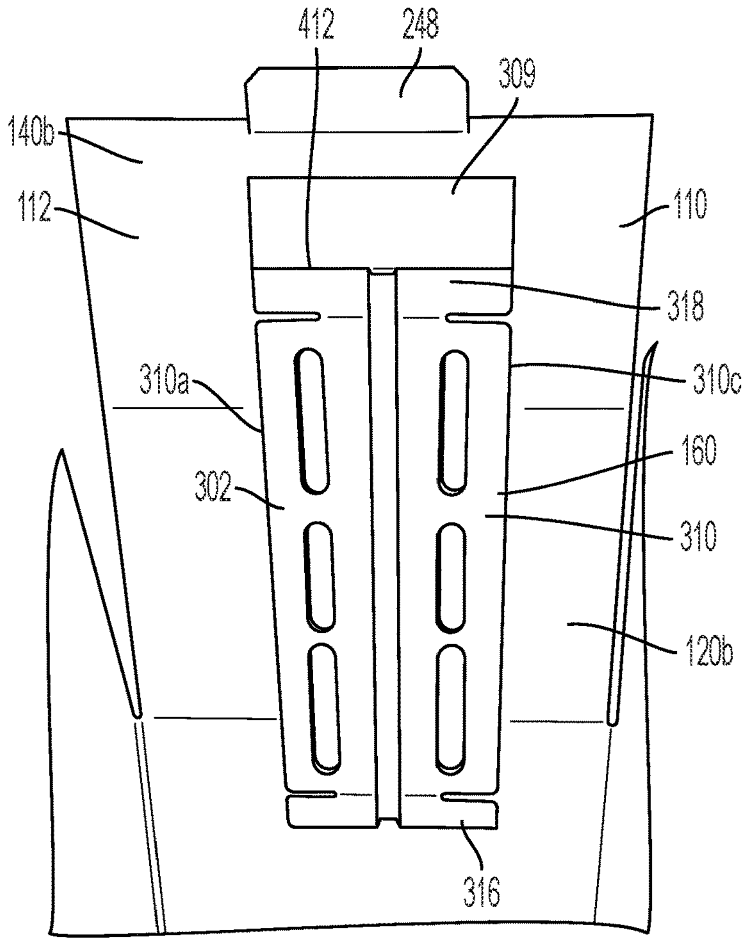
FIG. 4 is a front view of the hanger support member of FIG. 1 coupled to the wardrobe box of FIG. 1 in a pre-use configuration.

In example aspects, the first inner panel 304 can define a first adhesive region 330*a* extending substantially along a length of the first inner panel 304, proximate and parallel to the first parallel bend line 312*a* of the second hanger bend line 310*b*. Similarly, the second inner panel 306 can define a second adhesive region 330*b* extending substantially along a length of the second inner panel 306, proximate and parallel to the second parallel bend line 312*b* of the second hanger bend line 310*b*. The first outer panel 302 can be folded towards the first inner panel 304 and adhered thereto by the first adhesive region 330*a* to retain the first outer panel 302 in the folded position, as shown in FIG. 4. The second outer panel 308 can be folded towards the second inner panel 306 and adhered thereto by the second adhesive region 330*a* to retain the second outer panel 308 in the folded position, as shown in FIG. 4. The first and second adhesive regions 330*a,b* can comprise an adhesive, such as tape or glue, for example. In other aspects, the first outer panel 302 can be secured to the first inner panel 304 and the second outer panel 308 can be secured to the second inner panel 306 by any other suitable fastener or fastening technique known in the art.

FIG. 4 illustrates the hanger support member 160 removably attached to the wardrobe box 110 in a pre-use configuration, prior to assembling the wardrobe box assembly 100 (shown in FIG. 1). As shown, the first outer panel 302 can be folded relative to the first inner panel 304 (shown in FIG. 3) at the first hanger bend line 310*a* such that the first outer panel 302 can lie substantially flat against the first inner panel 304, and the second outer panel 308 can be folded relative to the second inner panel 306 (shown in FIG. 3) at the third hanger bend line 310*c* such that the second outer panel 308 can lie substantially flat against the second inner panel 306. The first and second outer panels 302,308 can be secured to the first and second inner panels 304,306 by a fastener, such as the first and second adhesive regions 330*a,b* (shown in FIG. 3). In other aspects, the first and second outer panels 302,308 may not be secured to the first and second inner panels 304,306.

Figure 5:
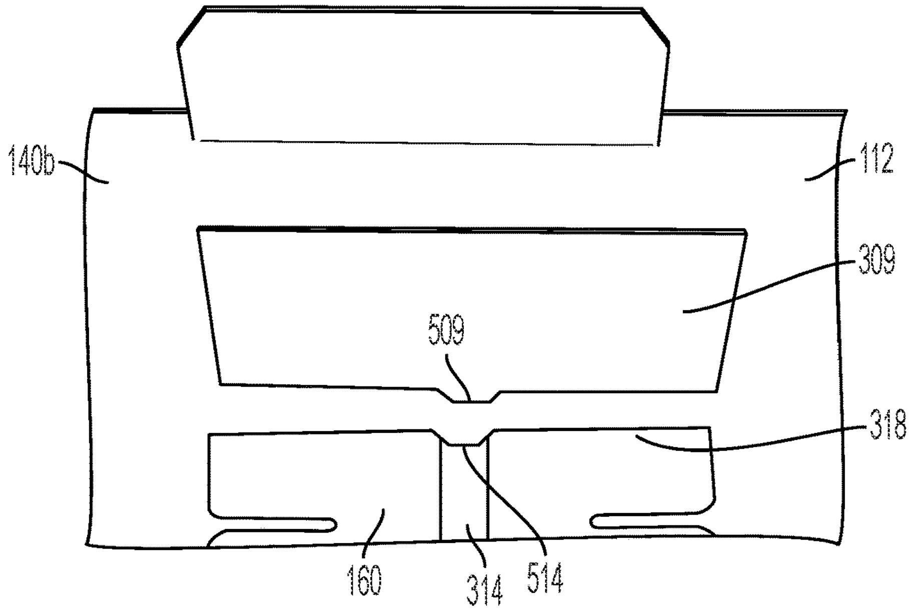
FIG. 5 is a front view of the hanger support member of FIG. 1 detached from the wardrobe box of FIG. 1.

In the present aspect, the attachment panel 309 can be secured to the inner box surface 112 of the wardrobe box 110 to couple the hanger support member 160 to the wardrobe box 110, as shown. For example, the attachment panel 309 can be secured to the wardrobe box 110 by an adhesive, such as glue, or any other suitable fastening technique known in the art. The first and second inner panels 304,306 can lie substantially flat against the inner box surface 112 of the wardrobe box 110, as shown, and the attachment panel 309 can be removably attached to the wardrobe box 110 at the right end 318 of the hanger support member 160. In other aspects, the first and second outer panels 302,308 can lie substantially flat against the wardrobe box 110 and/or the hanger support member 160 can be removably attached to the wardrobe box 110 at the left end 316 thereof. In other aspects, the hanger support member 160 can be removably attached to the outer box surface 114 (shown in FIG. 1) of the wardrobe box 110. In other aspects, the hanger support member 160 may be unfolded and attached to the wardrobe box 110 in the blank form of the hanger support member 160, as illustrated in FIG. 3. As shown, the hanger support member 160 can be detachably connected to the attachment panel 309 by a tear line 412, and can be configured to tear away from the attachment panel 309 at the tear line 412 to detach the hanger support member 160 from the wardrobe box 110. FIG. 5 illustrates the hanger support member 160 torn away from the attachment panel 309. As shown, in some aspects, the attachment panel 309 can define a tab 509 formed along the tear line 412 (shown in FIG. 4) and configured to engage a notch 514 formed in the hanger support member 160 when the hanger support member 160 is coupled thereto. The tab 509 can be disengaged from the notch 514 when the hanger support member 160 is detached from the attachment panel 309.

Figure 6:
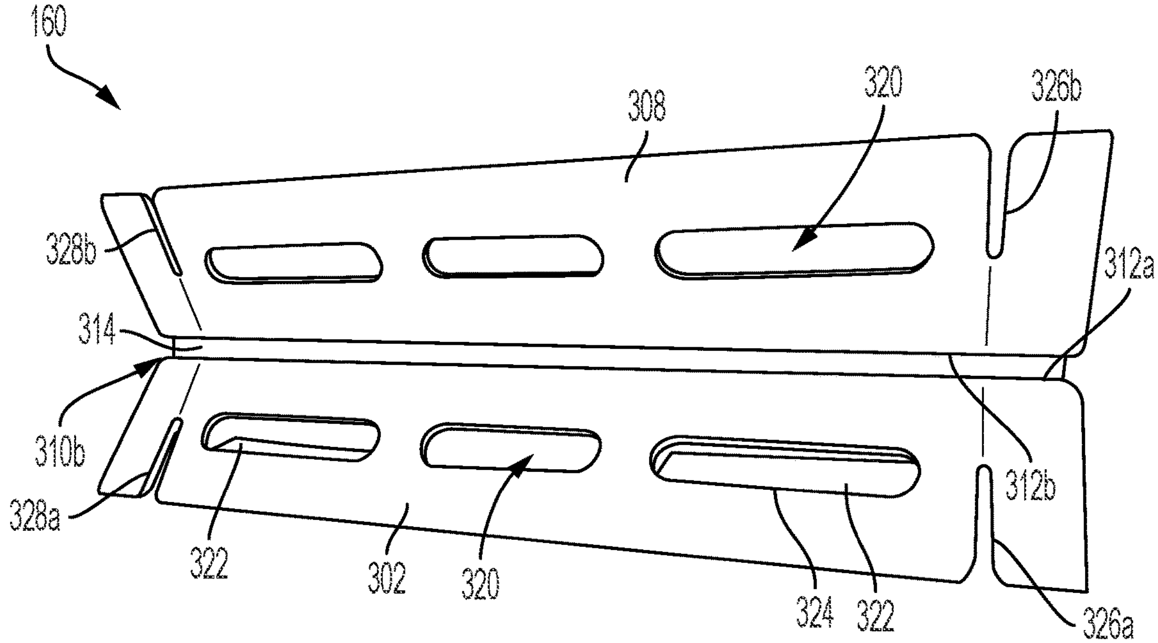
FIG. 6 illustrates a first step in folding the hanger support member of FIG. 1 to a folded orientation.
Figure 16:
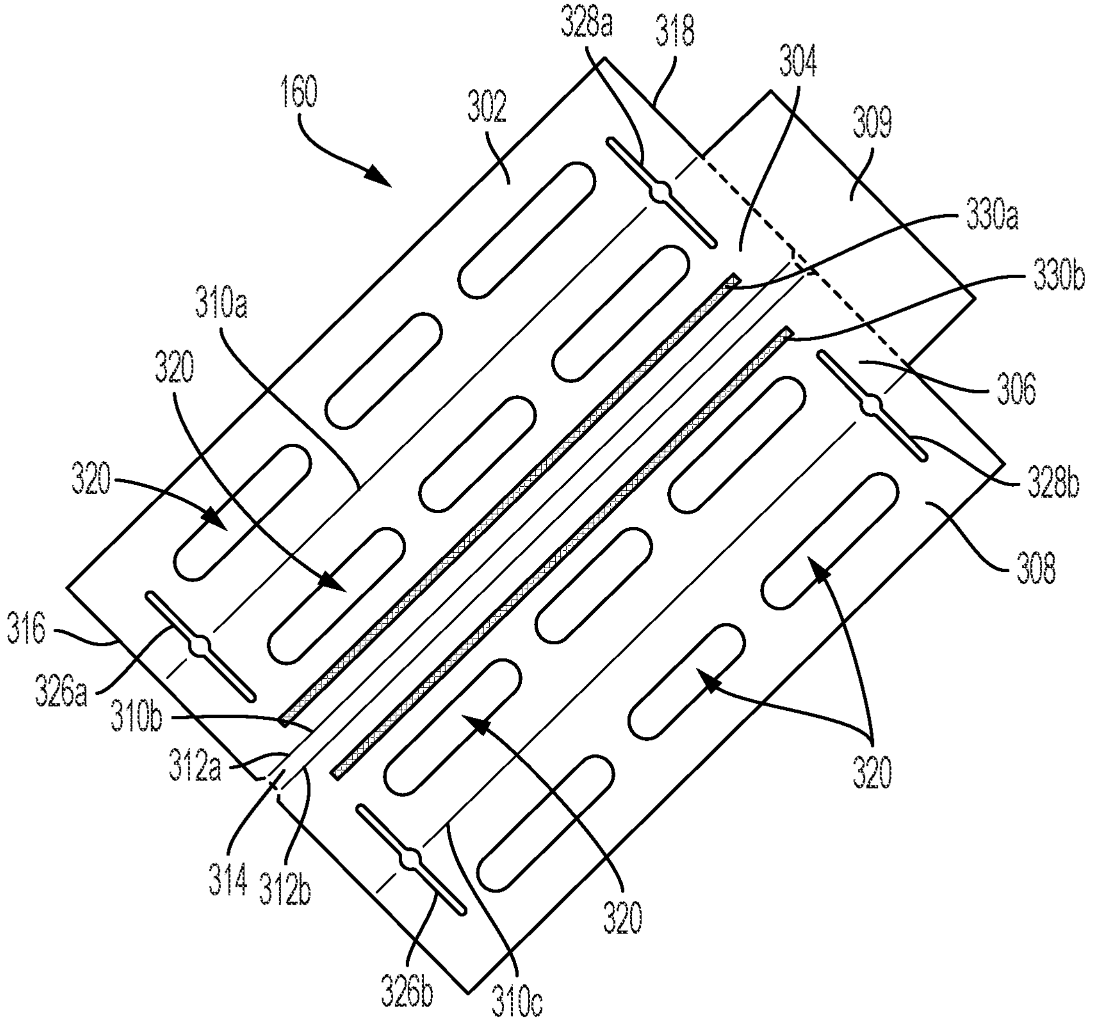
FIG. 16 illustrates a top elevation view of the hanger support member in blank form, according to another example aspect of the present disclosure.

FIG. 6 illustrates the lateral hanger flaps 322 folded at the corresponding hanger flap bend lines 324. The lateral hanger flaps 322 are shown folding into the page in the present view. The lateral hanger flaps 322 can be folded away from the first inner panel 304 (shown in FIG. 7) of the hanger support member 160 to uncover the corresponding lateral hanger apertures 320 formed through the first inner panel 304. In other aspects, the lateral hanger flaps 322 can be folded inward and through the corresponding lateral hanger apertures 320 formed through the first inner panel 304, second inner panel 306, and second outer panel 308. In still other aspects, the hanger support member 160 does not comprise the lateral hanger flaps 322, as illustrated in FIG. 16. FIG. 6 also illustrates folding the first inner panel 304 towards the second inner panel 306 (shown in FIG. 3) at the second hanger bend line 310*b*, such that the first and second outer panels 302,308 can be oriented between the first and second inner panels 304,306, and the first outer panel 302 can substantially confront and lie parallel to the second outer panel 308 in the folded orientation (shown in FIG. 7). Specifically, the first inner panel 304 can be folded at the first parallel bend line 312*a* of the second hanger bend line 310*b*, and the second inner panel 306 be folded at the second parallel bend line 312*b* of the second hanger bend line 310*b*. When folded, the first segment 340*a* (shown in FIG. 3) of each of the longitudinal hanger slots 326*a,b*, and 328*a,b* can overlay the corresponding second segment 340*b* (shown in FIG. 3) thereof to define shortened longitudinal hanger slots 326*a,b*, and 328*a,b*, as shown. In some aspects, the first outer panel 302 can be secured to the second outer panel 308 to retain the hanger support member 160 in the folded orientation.

Figure 7:
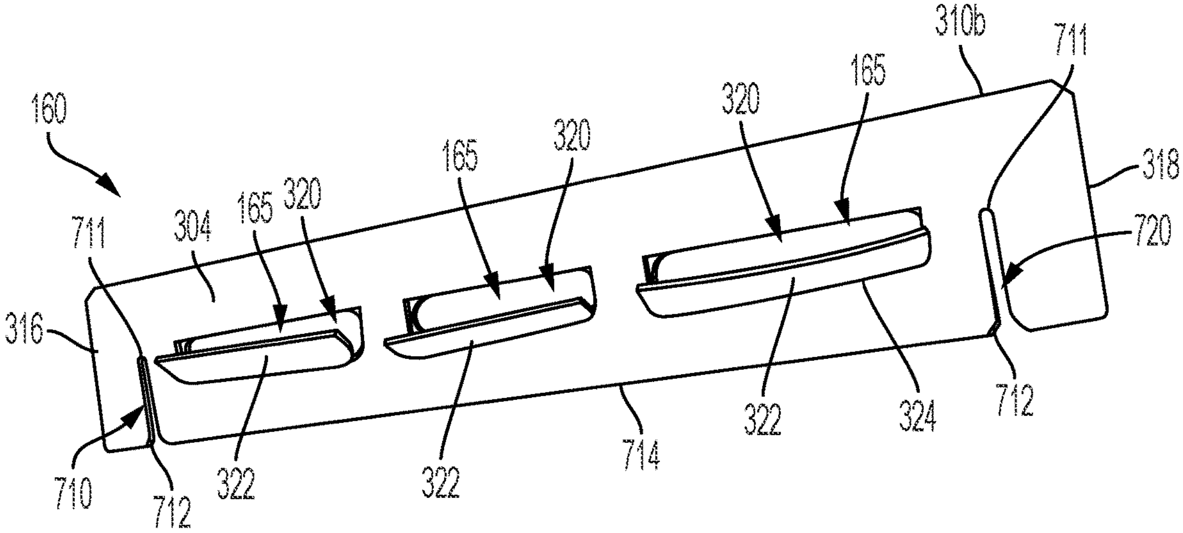
FIG. 7 illustrates the hanger support member of FIG. 1 in the folded orientation.

FIG. 7 illustrates the hanger support member 160 in the folded orientation. As shown, in the folded orientation, each of the lateral hanger apertures 320 of the first outer panel 302 (shown in FIG. 6) can align with each of the corresponding lateral hanger apertures 320 of the first inner panel 304, second inner panel 306 (shown in FIG. 3), and second outer panel 308 (shown in FIG. 3) to define the hanger openings 165 formed through the hanger support member 160. Additionally, in the folded orientation, the longitudinal hanger slot 326*a* (shown in FIG. 3) and the longitudinal hanger slot 326*b* (shown in FIG. 3) can align to define a first hanger engagement slot 710 proximate to the left end 316. Similarly, the longitudinal hanger slot 328*a* (shown in FIG. 3)

and the longitudinal hanger slot 328*b* (shown in FIG. 3) can align to define a second hanger engagement slot 720 proximate to the right end 318. Each of the first and second hanger engagement slots 710,720 can define an engagement slot opening 712 at a bottom side 714 of the hanger support member 160 in the folded orientation. Each of the first and second hanger engagement slots 710,720 can further define a closed engagement slot end 711 opposite the corresponding engagement slot opening 712.

Figure 9:
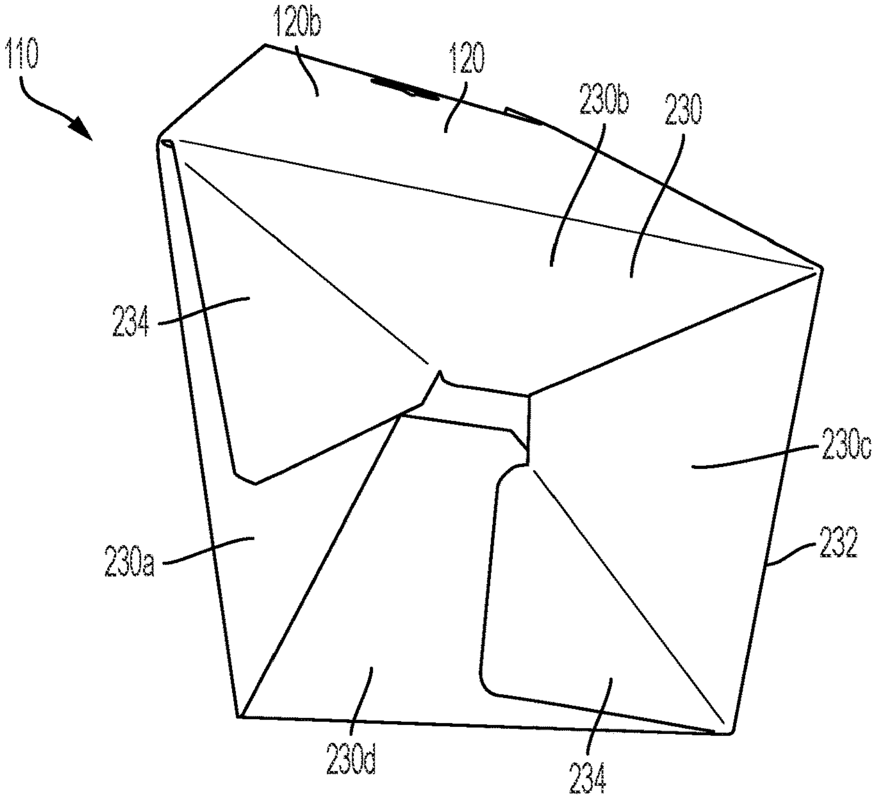
FIG. 9 illustrates a second step in configuring the wardrobe box of FIG. 1 in an expanded configuration.

FIGS. 8 and 9 illustrate first and second steps of reconfiguring the wardrobe box 110 from the blank form to the expanded configuration. The first and second steps can be performed in any order. Referring to FIG. 8, the side panels 120 of the wardrobe box 110 can be folded to define the sidewall enclosure 125 (also shown in FIG. 1), and the attachment flap 222 can be secured to the attachment region 224 to retain the side panels 120 in the folded position. In the present aspect, the attachment flap 222 can extend from the rear side panel 120*d* (shown in FIG. 1) and the attachment region 224 can be formed on the left side panel 120*a*. The attachment flap 222 can then be folded over the attachment region 224 and secured to the attachment region 224 by any suitable fastener, such as an adhesive. For example, in some aspects, the fastener can be a strip of glue 810, as shown. In other aspect, the attachment flap 222 can be any other suitable fastener known in the art. FIG. 8 illustrates the attachment flap 222 as it is being folded towards the attachment region 224. Furthermore, referring to FIG. 9, as described above, the bottom panels 230 can be folded at the corresponding bottom bend lines 232. The coupling area 234 of the front bottom panel 230*b* can be coupled to the left bottom panel 230*a*, and the coupling area 234 of the right bottom panel 230*c* can be coupled to the rear bottom panel 230*d* to retain the bottom panels 230 in the folded positions and to define a substantially planar floor of the wardrobe box 110. In some aspects, the wardrobe box 110 may be stored in a folded configuration, wherein the bottom panels 230 are disposed within the interior cavity 150 (shown in FIG. 1). In such an aspect, to expand the wardrobe box 110 to the expanded configuration, the bottom panels 230 can be pushed outward from the interior cavity 150, as shown, until the bottom panels 230 lie substantially perpendicular to the side panels 120.

Figure 10:
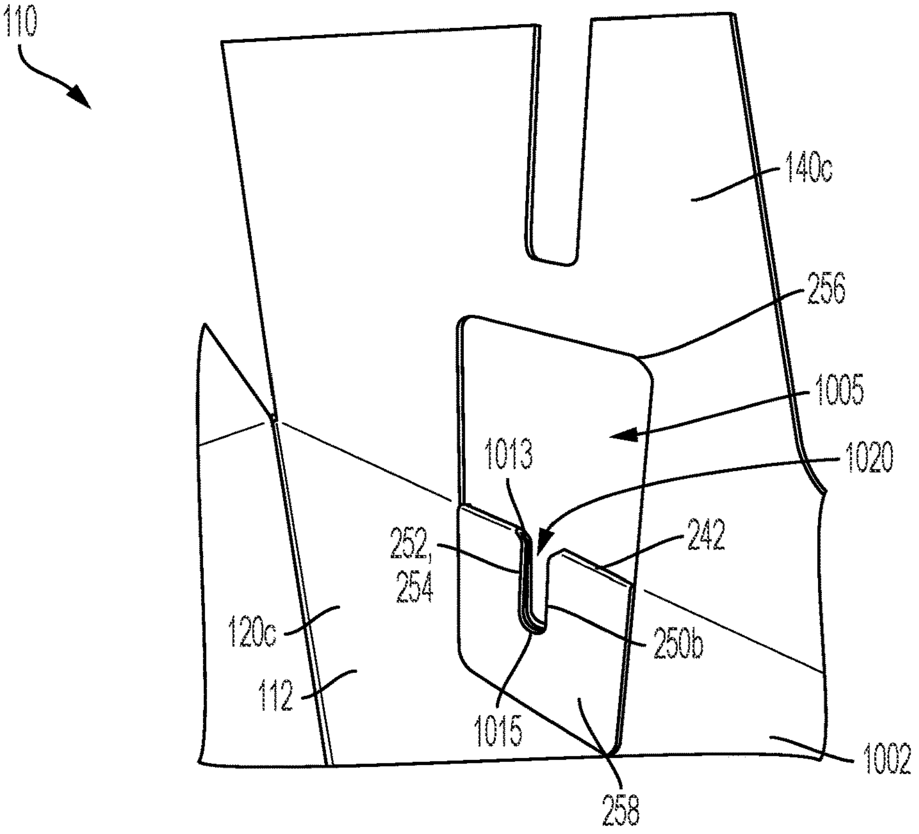
FIG. 10 illustrates folding a mounting flap of the wardrobe box of FIG. 1 to define a box mounting slot.

FIG. 10 is a detail view of an upper end 1002 of the right side panel 120*c* and the right top panel 140*c*. As shown, the mounting tab 258 of the right top panel 140*c* can be folded at the corresponding top bend line 242 towards the right side panel 120*c*. The mounting tab 258 can substantially confront the inner box surface 112 of the wardrobe box 110 and can lie substantially flat against the right side panel 120*c*. In some aspects, the mounting tab 258 can be secured to the right side panel 120*c* by a fastener, such as, for example and without limitation, an adhesive, such as glue. As the mounting tab 258 folds away from the right top panel 140*c*, the mounting tab 258 can uncover a mounting opening 1005 formed through the right top panel 140*c* and defined by the corresponding tab cut 256. Furthermore, the upper slot portion 252 of the corresponding longitudinal box slot 250*b* can laterally align with the lower slot portion 254 of the corresponding longitudinal box slot 250*b* to define a second box mounting slot 1020. The second longitudinal box slot 250*b* can define a mounting slot opening 1013 formed at the corresponding top bend line 242 and a closed mounting slot end 1015 opposite the mounting slot opening 1013. According to example aspects, the mounting tab 258 of the left top panel 140*a* (shown in FIG. 2) can be folded and secured to the left side panel 120*a* (shown in FIG. 1) in substantially the same manner to define a first box mounting slot 1010 (shown in FIG. 12). In other aspects, any other suitable fastener or fastening technique known in the art can secure the mounting tabs 258 to the corresponding left and right side panels 120*a,c*. In other aspects, one or both of the mounting tabs 258 can be folded towards, and in some aspects secured to, the outer box surface 114 (shown in FIG. 1) of the wardrobe box 110.

Figure 11:
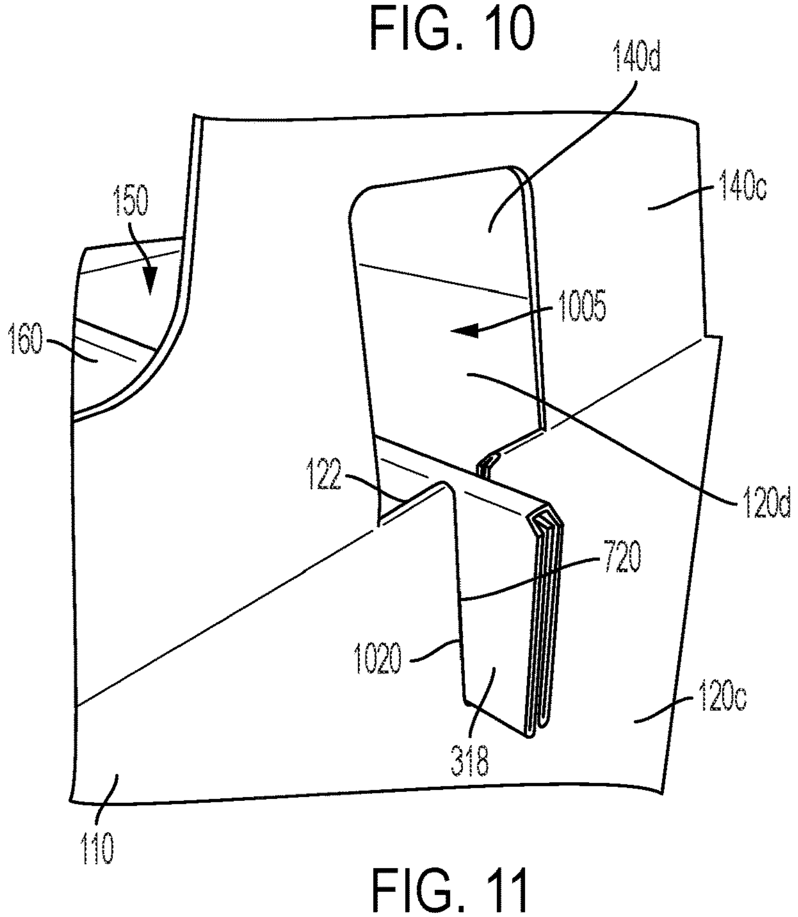
FIG. 11 illustrates engaging the hanger support member of FIG. 1 with the box mounting slot of FIG. 10.

FIG. 11 illustrates mounting the hanger support member 160 on the wardrobe box 110. A detail view of the right end 318 of the hanger support member 160 and the second box mounting slot 1020 formed at the top edge 122 of the right side panel 120*c* are shown. To mount the hanger support member 160 on the wardrobe box 110, the hanger support member 160 can extend across the interior cavity 150 of the wardrobe box 110. The right end 318 of the hanger support member 160 can extend through the mounting opening 1005 formed in the right top panel 140*c*, and the left end 316 (shown in FIG. 3) of the hanger support member 160 can extend through the mounting opening 1005 formed in the left top panel 140*a* (shown in FIG. 2). The second hanger engagement slot 720 adjacent to the right end 318 of the hanger support member 160 can engage the second box mounting slot 1020 of the wardrobe box 110, as shown, and similarly, the first hanger engagement slot 710 (shown in FIG. 7) adjacent to the left end 316 of the hanger support member 160 can engage the first box mounting slot 1010 (shown in FIG. 12). The engagement of the first and second hanger engagement slots 710,720 with the corresponding first and second box mounting slots 1010,1020 can be advanced until the engagement slot end 711 (shown in FIG. 7) of each first and second hanger engagement slots 710,720 abuts the mounting slot end 1015 (shown in FIG. 10) of the corresponding first and second box mounting slot 1020, as shown. The hanger support member 160 can thereby rest on the mounting slot ends 1015 of the wardrobe box 110.

Figure 12:
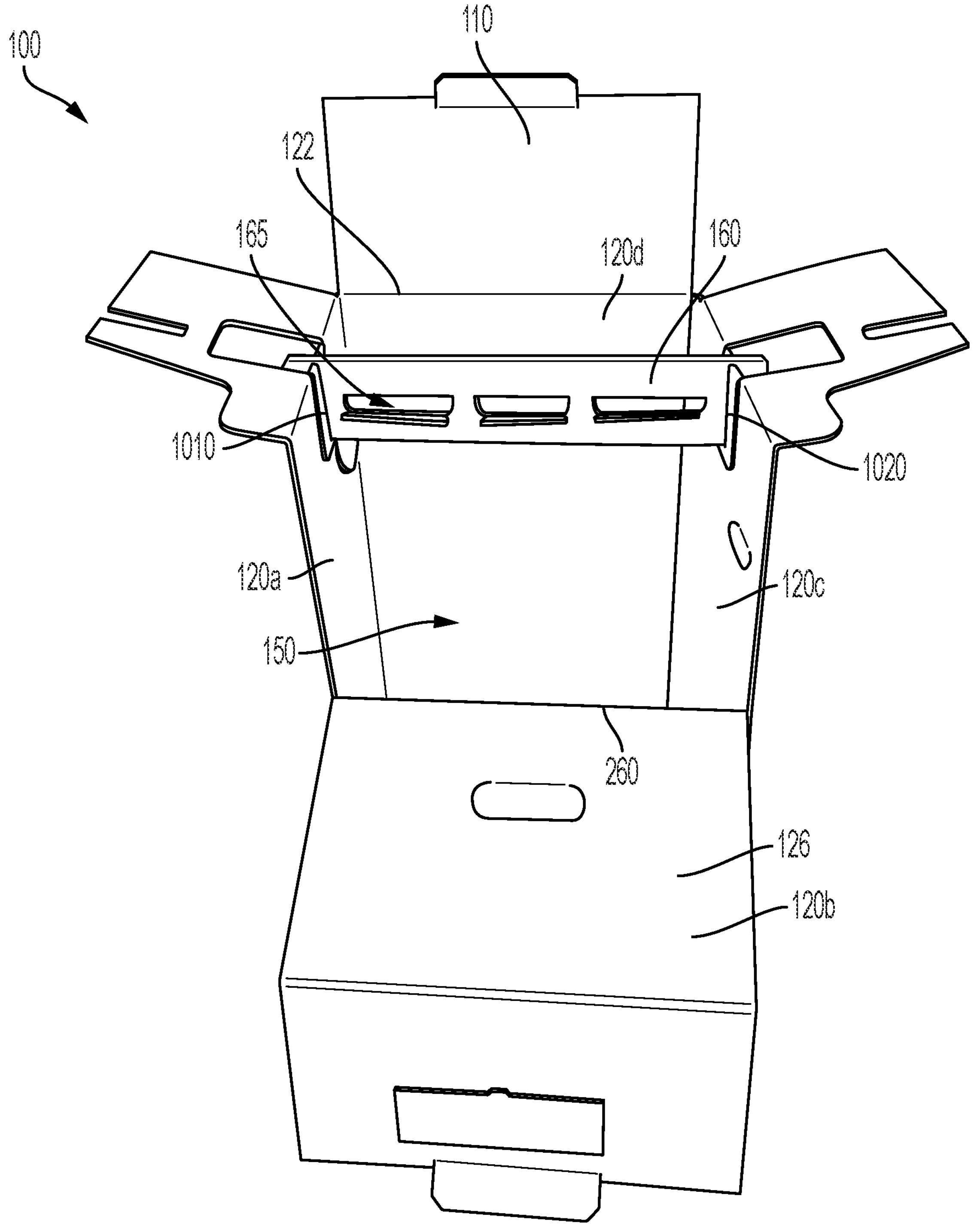
FIG. 12 illustrates the hanger support member of FIG. 1 assembled with the wardrobe box of FIG. 1 to define the wardrobe box assembly of FIG. 1, wherein the wardrobe box assembly is in the open configuration and the hanger support member is in the use configuration.

FIG. 12 illustrates a front view of the assembled wardrobe box assembly 100 comprising the hanger support member 160 mounted on the wardrobe box 110. The wardrobe box assembly 100 is shown in the open configuration. As shown, the hanger support member 160 can extend across the interior cavity 150 from the left side panel 120*a* to the right side panel 120*c* at or near the top edges 122 of the corresponding left and right side panels 120*a,c*. The hanger support member 160 can be spaced about centrally between and oriented about parallel to the front side panel 120*b* and the lower panel portion 128 (shown in FIG. 1) of the rear side panel 120*d*. In the present aspect, the upper panel portion 126 of the front side panel 120*b* can be folded away from the interior cavity 150 at the folding bend line 260 to allow for increased access to the interior cavity 150. In other aspects, the upper panel portion 126 of the front side panel 120*b* may not be folded relative to the lower panel portion 128 and can remain planar with the lower panel portion 128. To use the wardrobe box 110 for supporting hanging clothes within the interior cavity 150, a hook end of a hanger can engage one of the hanger openings 165, and the hanger support member 160 can suspend the hanger on the hanger support member 160 within the interior cavity 150. In some aspects, the lateral hanger flaps 322 can provide additional contact points for the hook ends of the hangers. Other aspects of the hanger support member 160 may not comprise the lateral hanger flaps 322. Clothing can be hung on the hanger to receive and support the clothing within the interior cavity 150.

Figure 13:
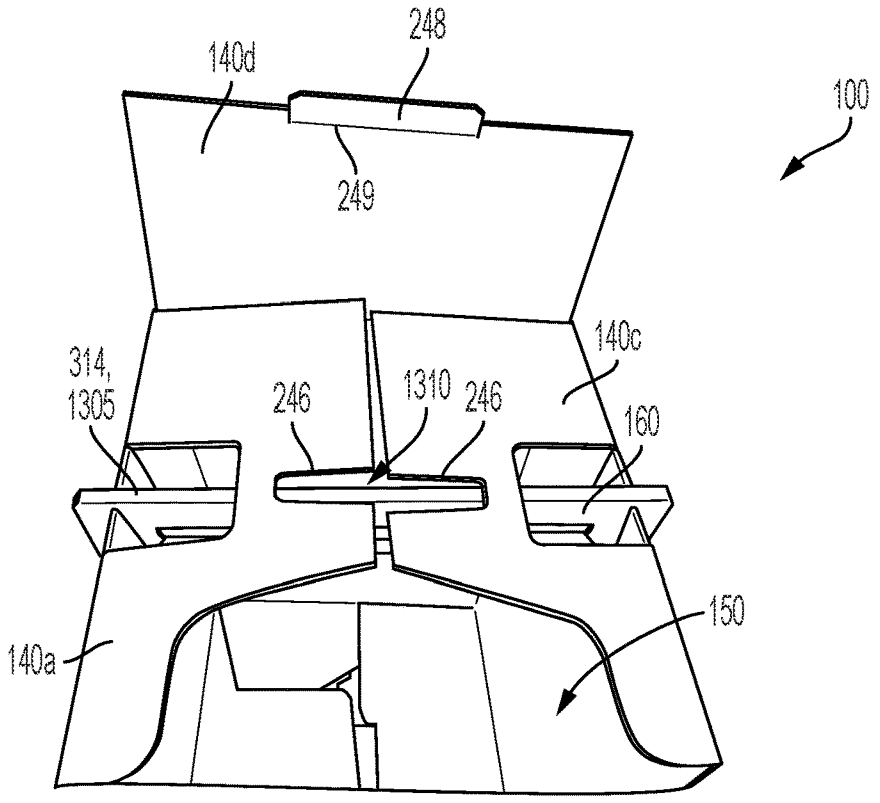
FIG. 13 illustrates a first step in configuring the wardrobe box assembly in a closed configuration.

In example aspects, the wardrobe box assembly 100 can be oriented in the closed configuration to selectively prohibit access to the interior cavity 150. It may be desirable to orient the wardrobe box assembly 100 in the closed configuration for the protection and storage of clothing received therein. FIG. 13 illustrates a first step in configuring the wardrobe box assembly 100 in the closed configuration. As shown, each of the left top panel 140*a* and the right top panel 140*c* can be folded inward towards the interior cavity 150. In the present aspect, each of the right top panel 140*c* and left top panel 140*a* can substantially confront, and in some aspects can rest on, the top side 1305 of the hanger support member 160. The top side 1305 of the hanger support member 160 can be defined by the elongated spine 314 in the present aspect. The closure slot 246 of the left top panel 140*a* can be substantially laterally aligned with the closure slot 246 of the right top panel 140*c* to define a closure opening 1310, as shown. Furthermore, according to example aspects, each of the closure tabs 248 of the front and rear panels 140*b,d* (front panel 140*b* shown in FIG. 1) can be bent inward towards one another at the corresponding closure bend lines 249, as shown.

Figure 14:
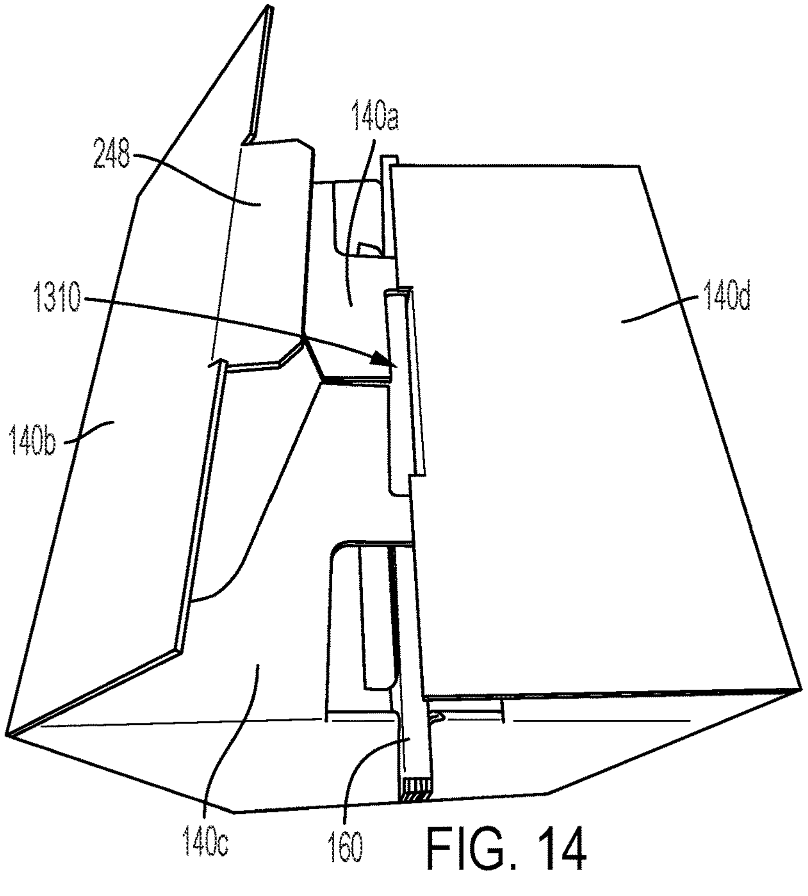
FIG. 14 illustrates a second step in configuring the wardrobe box assembly in the closed configuration.

FIG. 14 illustrates a next step in configuring the wardrobe box assembly 100 in the closed configuration. As shown, the closure tab 248 extending from the rear top panel 140*d* can be inserted through the closure opening 1310, such that it can be oriented about perpendicular to the rear top panel 140*d* and can extend along the second inner panel 306 (shown in FIG. 6) of the hanger support member 160. Thus, the closure tab 248 of the rear top panel 140*d* can effectively hook onto the left and right top panels 140*a,c* to retain the rear top panel 140*d* in the closed configuration. In some aspects, the closure tabs 248 can be retained within the closure opening 1310 by frictionally abutting the hanger support member 160. The closure tab 248 extending from the front top panel 140*b* can be similarly inserted through the closure opening 1310 and can extend along the first inner panel 304 (shown in FIG. 3) of the hanger support member 160. In other aspects, the closure tab 248 extending from the front top panel 140*b* can first engage the closure opening 1310 followed by the closure tab 248 extending from the rear top panel 140*d*, or both of the closure tabs 248 can simultaneously be engaged with the closure opening 1310. FIG. 15 illustrates the wardrobe box assembly 100 in the closed configuration. The wardrobe box assembly 100 can be opened again by simply pulling the front and rear top panels 140*b,d* upward, relative to the orientation shown, to disengage the corresponding closure tabs 248 (shown in FIG. 2) from the closure opening 1310 (shown in FIG. 13).

FIG. 16 illustrates the hanger support member 160 according to another example aspect of the present disclosure. As shown, the hanger support member 160 can define the first outer panel 302, the first inner panel 304, the second inner panel 306, and the second outer panel 308. The first outer panel 302 can be hingedly connected to the first inner panel 304 by the first hanger bend line 310*a*, the second inner panel 306 can be hingedly connected to the first inner panel 304 opposite the first outer panel 302 at the second hanger bend line 310*b*, and the second outer panel 308 can be hingedly connected to the second inner panel 306 opposite the first inner panel 304 at the third hanger bend line 310*c*. In the present aspect, the second hanger bend line 310*b* can define the first and second parallel bend lines 312*a,b* and the elongated spine 314 therebetween. In some aspects, some or all of the first, second, and third hanger bend lines 310*a,b,c* can comprise perforations configured to facilitate folding along the corresponding hanger bend lines 310*a,b,c*.

The first inner panel 304 can define the first adhesive region 330*a* proximate and parallel to the first parallel bend line 312*a*, and the second inner panel 306 can define the second adhesive region 330*b* proximate and parallel to the second parallel bend line 312*b*. The first outer panel 302 can be folded towards the first inner panel 304 and adhered thereto by the first adhesive region 330*a*, and the second outer panel 308 can be folded towards the second inner panel 306 and adhered thereto by the second adhesive region 330*a*, as shown in FIG. 4.

The hanger support member 160 can further define the left end 316 and the right end 318. The attachment panel 309 can be detachably coupled to the hanger support member 160 at the right end 318 thereof. The first pair of longitudinal hanger slots 326*a,b* can be formed through the hanger support member 160 adjacent to the left end 316, and the second pair of longitudinal hanger slots 328*a,b* can be formed through the hanger support member 160 adjacent to the right end 318. The longitudinal hanger slots 326*a,b* and 328*a,b* can be oriented substantially perpendicular to the first, second, and third hanger bend lines 310*a,b,c*. Furthermore, the plurality of lateral hanger apertures 320 can be formed through each of the first outer panel 302, the first inner panel 304, the second inner panel 306, and the second outer panel 308. As shown, the present aspect of the hanger support member 160 does not comprise the lateral hanger flaps 322 (shown in FIG. 3) covering the lateral hanger apertures 320 defined in the first inner panel 304.

One should note that conditional language, such as, among others, “can,” “could,” “might,” or “may,” unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A wardrobe box comprising:

a sidewall enclosure comprising a plurality of side panels, the plurality of side panels comprising a first side panel and a second side panel opposite the first side panel, the sidewall enclosure at least partially defining an interior cavity of the wardrobe box;

a first box mounting slot defined at a top edge of the first side panel and configured to engage a hanger support member, the first box mounting slot extending into the first side wall panel from a first mounting slot opening defined at the top edge of the first side wall portion to a first closed mounting slot end defined opposite the first mounting slot opening;

a second box mounting slot defined at a top edge of second side panel and configured to engage the hanger support member, the second box mounting slot extending into the second side wall panel from a second mounting slot opening defined at the top edge of the second side wall portion to a second closed mounting slot end defined opposite the second mounting slot opening; and a plurality of top panels, the plurality of top panels including a first top panel hingedly connected to the top edge of the first side panel at a first top bend line and a second top panel hingedly connected to the top edge of the second side panel at a second top bend line, the first top panel and the second top panel configured to fold over the interior cavity at a top enclosure end of the sidewall enclosure;

wherein;

the first top panel defines a first opening in communication with the first box mounting slot, and wherein the second top panel defines a second opening in communication with the second box mounting slot;

the first top panel defines a first mounting tab hingedly coupled to the first side panel and defining the first opening;

the second top panel defines a second mounting tab hingedly coupled to the second side panel and defining the second opening; and the first mounting tab is folded to confront the first side panel in a first folded tab configuration and the second mounting tab is folded to confront the second side panel in a second folded tab configuration;

the first opening is a first upper slot portion, the first box mounting slot is a first lower slot portion, and the first upper slot portion and the first lower slot portion together define a first box slot;

the second opening is a second upper slot portion, the second box mounting slot is a second lower slot portion, and the second upper slot portion and the second lower slot portion together define a second box slot;

the first upper slot portion is laterally aligned with the first lower slot portion in the first folded tab configuration; and the second upper slot portion is laterally aligned with the second lower slot portion in the second folded tab configuration.

2. The wardrobe box of claim 1, wherein the first mounting tab is folded into the interior cavity of the wardrobe box in the first folded tab configuration, and wherein the second mounting tab is folded into the interior cavity of the wardrobe box in the second folded tab configuration.

3. The wardrobe box of claim 1, wherein:

the plurality of side panels further comprise a third side panel extending between the first and second side panels and a fourth side panel extending between the first and second side panels; and the plurality of top panels further comprise a third top panel hingedly connected to a top edge of the third side panel and a fourth top panel hingedly connected to a top edge of the fourth side panel.

4. The wardrobe box of claim 3, wherein:

a first opposing pair of the top panels of the plurality of top panels each define a closure slot that is opposite from the top edge thereof;

the closure slots together define a closure opening in a closed configuration of the wardrobe box;

a second opposing pair of the top panels of the plurality of top panels each define a closure tab that is opposite from the top edge thereof; and each of the closure tabs engage the closure opening in the closed configuration.

5. The wardrobe box of claim 3, further comprising a plurality of bottom panels, wherein one of the plurality of bottom panels is hingedly connected to a bottom edge of each of the first side panel, the second side panel, the third side panel, and the fourth side panel.

6. The wardrobe box of claim 5, wherein:

a first coupling area extends from a first bottom panel of the plurality of bottom panels and is coupled to a second bottom panel of the plurality of bottom panels, the second bottom panel adjacent to the first bottom panel; and a second coupling area extends from a third bottom panel of the plurality of bottom panels and is coupled to a fourth bottom panel of the plurality of bottom panels, the fourth bottom panel adjacent to the third bottom panel.

7. The wardrobe box of claim 3, wherein the third side panel defines a lower panel portion and an upper panel portion hingedly connected to the lower panel portion, the lower panel portion attached to each of the first side panel and the second side panel, the upper panel portion unattached to each of the first side panel and the second side panel.

8. The wardrobe box of claim 1, wherein an opposing pair of side panels of the plurality of side panels each define a handle cut, each of the handle cuts defining a handle flap hingedly coupled to the corresponding side panel by a handle bend line.

9. A wardrobe box comprising:

a sidewall enclosure comprising a plurality of side panels, the plurality of side panels comprising a first side panel and a second side panel opposite the first side panel, the sidewall enclosure at least partially defining an interior cavity of the wardrobe box;

a first box mounting slot defined at a top edge of the first side panel and configured to engage a hanger support member, the first box mounting slot extending into the first side wall panel from a first mounting slot opening defined at the top edge of the first side wall portion to a first closed mounting slot end defined opposite the first mounting slot opening;

a second box mounting slot defined at a top edge of second side panel and configured to engage the hanger support member, the second box mounting slot extending into the second side wall panel from a second mounting slot opening defined at the top edge of the second side wall portion to a second closed mounting slot end defined opposite the second mounting slot opening; and a plurality of top panels, the plurality of top panels including a first top panel hingedly connected to the top edge of the first side panel at a first top bend line and a second top panel hingedly connected to the top edge of the second side panel at a second top bend line, the first top panel and the second top panel configured to fold over the interior cavity at a top enclosure end of the sidewall enclosure;

wherein:

the first top panel defines a first opening in communication with the first box mounting slot, and wherein the second top panel defines a second opening in communication with the second box mounting slot;

the first top panel defines a first mounting tab hingedly coupled to the first side panel and defining the first opening;

the second top panel defines a second mounting tab hingedly coupled to the second side panel and defining the second opening; and the first mounting tab is folded to confront the first side panel in a first folded tab configuration and the second mounting tab is folded to confront the second side panel in a second folded tab configuration;

the first mounting tab is folded into the interior cavity of the wardrobe box in the first folded tab configuration, and wherein the second mounting tab is folded into the interior cavity of the wardrobe box in the second folded tab configuration.

10. The wardrobe box of claim 9, wherein:

the first opening is a first upper slot portion, the first box mounting slot is a first lower slot portion, and the first upper slot portion and the first lower slot portion together define a first box slot;

the second opening is a second upper slot portion, the second box mounting slot is a second lower slot portion, and the second upper slot portion and the second lower slot portion together define a second box slot;

the first upper slot portion is laterally aligned with the first lower slot portion in the first folded tab configuration; and the second upper slot portion is laterally aligned with the second lower slot portion in the second folded tab configuration.

11. The wardrobe box of claim 9, wherein:

the plurality of side panels further comprise a third side panel extending between the first and second side panels and a fourth side panel extending between the first and second side panels; and the plurality of top panels further comprise a third top panel hingedly connected to a top edge of the third side panel and a fourth top panel hingedly connected to a top edge of the fourth side panel.

12. The wardrobe box of claim 11, wherein:

a first opposing pair of the top panels of the plurality of top panels each define a closure slot that is opposite from the top edge thereof;

the closure slots together define a closure opening in a closed configuration of the wardrobe box;

a second opposing pair of the top panels of the plurality of top panels each define a closure tab that is opposite from the top edge thereof; and each of the closure tabs engage the closure opening in the closed configuration.

13. The wardrobe box of claim 11, further comprising a plurality of bottom panels, wherein one of the plurality of bottom panels is hingedly connected to a bottom edge of each of the first side panel, the second side panel, the third side panel, and the fourth side panel.

14. The wardrobe box of claim 13, wherein:

a first coupling area extends from a first bottom panel of the plurality of bottom panels and is coupled to a second bottom panel of the plurality of bottom panels, the second bottom panel adjacent to the first bottom panel; and a second coupling area extends from a third bottom panel of the plurality of bottom panels and is coupled to a fourth bottom panel of the plurality of bottom panels, the fourth bottom panel adjacent to the third bottom panel.

15. The wardrobe box of claim 11, wherein the third side panel defines a lower panel portion and an upper panel portion hingedly connected to the lower panel portion, the lower panel portion attached to each of the first side panel and the second side panel, the upper panel portion unattached to each of the first side panel and the second side panel.

16. The wardrobe box of claim 9, wherein an opposing pair of side panels of the plurality of side panels each define a handle cut, each of the handle cuts defining a handle flap hingedly coupled to the corresponding side panel by a handle bend line.

* * * * *